United States Patent [19]

Kramer et al.

[11] 3,993,504

[45] Nov. 23, 1976

[54] METHOD FOR THE MANUFACTURE OF A NEGATIVE ELECTRODE CONTAINING A DISCHARGE RESERVE FOR GAS-TIGHT ALKALINE STORAGE BATTERIES

[75] Inventors: Günter Kramer; Peter Ness, both of Kelkheim; Hans-Hermann von Döhren, Frankfurt am Main, all of Germany

[73] Assignee: Varta Batterie Aktiengesellschaft, Kelkheim, Taunus, Germany

[22] Filed: Dec. 5, 1975

[21] Appl. No.: 638,173

[30] Foreign Application Priority Data

Feb. 25, 1975 Germany............................ 2507988

[52] U.S. Cl.................................. 427/126; 427/58; 29/623.5
[51] Int. Cl.²......................................... H01M 35/18
[58] Field of Search......................... 136/24, 28–31, 136/75–76, 20, 120 R; 204/96, 114, 115

[56] References Cited

UNITED STATES PATENTS

| | | | |
|---|---|---|---|
| 3,041,388 | 6/1962 | Fukuda et al. | 136/24 |
| 3,288,643 | 11/1966 | Stark | 136/24 |
| 3,489,612 | 1/1970 | Falk | 136/24 |
| 3,847,668 | 11/1974 | Kramer et al. | 136/24 X |

*Primary Examiner*—Anthony Skapars
*Attorney, Agent, or Firm*—Herbert L. Lerner

[57] ABSTRACT

Method for the manufacture of a negative cadmium electrode containing a discharge reserve for gas-tight alkaline storage batteries by incorporating an organic cadmium compound into the electrode structure and roasting to thermally dissociate the organic compound to produce the discharge reserve. Additional features are incorporation of an organic nickel compound which also decomposes to form nickel and adding a control gas to aid in control of content of discharge reserve.

8 Claims, No Drawings

METHOD FOR THE MANUFACTURE OF A NEGATIVE ELECTRODE CONTAINING A DISCHARGE RESERVE FOR GAS-TIGHT ALKALINE STORAGE BATTERIES

This invention relates to alkaline accumulators and more particularly refers to a new and improved method for the manufacture of a negative cadmium electrode containing a discharge reserve for gas-tight alkaline storage batteries (accumulators).

Gas-tight alkaline storage batteries, are known in the art, e.g. U.S. Pat. No. 3,847,668, and contain not only a surplus of chargeable negative mass (reserve for charging), but also an additional part of dischargeable negative mass, in order to assure, respectively increased operating reliability in the case of overload, high current drain and maximum discharge. This so-called discharge reserve has the purpose, in the case of to-depletion-leading discharge, as occurs with single or battery connected cells, of controlling the generation of gas at the reversal of polarity of such cells in such a manner that the generation of oxygen at the reversed negative electrode is delayed until, in the antipolar portion of the positive electrode, a sufficient part of cadmium hydroxide is reduced to metallic cadmium. By means of the presence of a $Cd/Cd(OH)_2$ system, the conditions are right for the reduction of the oxygen which is generated at the reversed negative electrode. Since under these conditions in the cells, with reversed polarity, the development of hydrogen is impossible and the oxygen is reduced to hydroxyl ions, the reversed cells continue to operate under a discharging load without the risk of damage.

A surplus of charged negative mass in relation to the effective capacity of the positive mass is especially useful at high current discharges, because the negative mass is in its behavior with respect to capacity noticeably more load dependent than the positive mass. The usual capacity limitation given by the positive mass can be maintained with proper adjustment of the amount of charged negative mass.

The adjustment of the ratio of chargeable to dischargeable mass is relatively simple with electrodes of pressed active mass, for instance by a preparation of a $Cd/Cd(OH)_2$ mixture by an electrolytic method or by addition in the required amounts of powdered cadmium metal to cadmium oxide, or cadmium hydroxide. However, with cells with sintered electrodes, the adjustment of the discharge reserve requires a considerable number of added manufacturing steps.

In many instances, one is satisfied with the discharge reserve which is automatically created after installation of uncharged electrodes and charging them in the gas-tight condition when starting the operation, due to the fact that the active mass of the positive electrode cannot be completely reconverted into nickel hydroxide $Ni(OH)_2$ with an oxidation grade 1,00. A few percent of non-dischargeable mass remain on the positive electrode, which appear on the negative opposing electrode in an equivalent amount as discharge reserve. This quantity is small and insufficient to assure the capacity limitation by the positive electrode in case of high current discharge. Thus, danger of premature development of oxygen exists when reversing polarity, i.e. at a time when, at the antipolar part of the positive electrode, the condition for consuming $O_2$ does not yet exist. The usual methods for the production of a sufficient surplus charge, respectively for charging reserve of the negative electrodes, require an electric treatment in the unsealed condition of the cell, very often with a considerable excess of electrolyte which has to be removed from the cell before closing - as a consequence the process cannot be controlled and reproducible results are difficult if not impossible. The unavoidable wetting with electrolyte of the sealing surface requires a careful cleaning operation and even the risk of later leakage problems is not completely eliminated.

It is known to produce the discharge reserve by addition of a reduction agent which is in conductive contact with the negative mass and which reduces, proportional to its amount, after filling of the cell with electrolyte a part of the cadmium hydroxide to metallic cadmium. In a variation of this process, the reduction agent is added to the antipolar mass of the positive electrode. When wetted with the electrolyte, an equivalent amount of the antipolar mass is reduced and causes thereby, during charging an advanced action of the negative electrode which produces the discharge reserve. For this purpose, metallic zinc has been proven to be a reliable reduction agent. Notwithstanding the usefulness of these methods, their application requires care, because it must be made certain that no metallic zinc is contained in the cell when the unit is sealed.

Also the methods according to which the negative sinter-foil-electrodes are electrically treated before their installation, for instance if they receive a predetermined pre-charge or are discharged to a predetermined charge level after being fully charged, require an effective assurance of retention in this state which can only be realized by cumbersome washing and drying steps with greatly varying results.

Therefore, it is an object of the present invention to provide a method for the production of a negative electrode with discharge reserve, which method can be carried out easily and particularly which makes it possible to maintain the amount of the discharge reserve within narrow limits even when used in mass production. This object is achieved in accordance with the invention, by producing the discharge reserve by thermal dissociation of an organic cadmium compound which is introduced into the electrode structure. Cadmium compounds suitable for the practice of the present invention are, for instance, formates, oxalates, and acetates, of which the use of cadmium formate is preferred.

At a temperature between 150° and 300° C cadmium formate dissociates as follows:

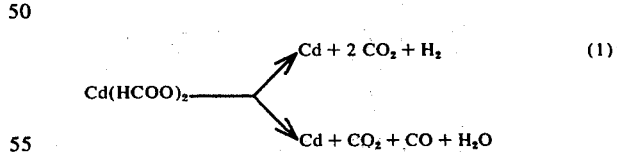

(1)

As will be noted from the above equations gases are generated producing thereby the required reducing atmosphere. The temperature to which the organic cadmium compound is heated to effect decomposition is desirably below the vaporization temperature of cadmium preferably below 500° and within the range of 150° and 300° C.

A method for the production of a discharge reserve in negative sinter electrodes is described in the following examples. Negative raw sinter foils are impregnated in the usual conventional manner by soaking with cadmium nitrate solution and subsequent precipitation of cadmium hydroxide by means of an alkali solution. This is repeated several times, as often as necessary, until the foil contains the desired amount of Cd(OH)₂ which is needed for the required capacity.

Thereafter, in accordance with the invention, the foil containing Cd(OH)₂ is subjected to an additional soaking with a cadmium formate solution. The raw sinter foil is pre-dried and then roasted at the above-mentioned temperature of 150° – 300° C. There occurs as a result, dissociation of the cadmium formate according to equation (1), and also dehydration of the cadmium hydroxide according to equation (2).

$$Cd(OH)_2 \rightarrow CdO + H_2O \qquad 2.$$

The oxidizing influence of the water vapor which could decrease the metallic fraction generated according to equation (1), can be counteracted by a flow of hydrogen during the roasting process.

Alternatively the capacity carrying negative cadmium-oxide mass may be produced by roasting in the usual manner first, then applying and impregnating it with the organic cadmium compound solution, whereby the cadmium oxide which was formed during the roasting is re-hydrated by the water content. Subsequently the electrode is again roasted in order to botain the finished electrode which contains cadmium oxide and cadmium.

Generally and favorably, the roasting takes place in the reducing atmosphere which is produced by the thermal dissociation of the organic cadmium compound. It is possible to control, within wide limits, the degree of reduction of the negative mass i.e. the content of metallic cadmium and therefore, the discharge reserve, by the amount of impregnated formates, by the dissociation or roasting temperature and by the content of the protective gas. As an aid in controlling the content of metallic cadmium, introduction of hydrogen to the reducing atmosphere generated at the dissociation as an added reduction agent is particularly advantageous. An inert gas such as nitrogen may be added to facilitate carrying away of H₂O and prevent oxidation of the cadmium. Oxygen as an oxidizing gas may be added in order to alter the ratio of the cadmium oxide to cadmium within special limits.

In a further embodiment, a solution of an organic nickel compound, preferably nickel formate, which thermally dissociates is added to the solution of the organic cadmium compound, so that, after the dissociation process, finely distributed nickel is contained in the electrode resulting in improved conductivity.

The roasting process has the additional advantages of reduction of the content of nitrogen compounds and of improvement in the ability of the gas-tight cell to maintain a charge which properties otherwise can only be achieved by an electrical preparatory treatment of the foils, the so-called pre-formation.

A further advantage is increased flexibility of the foils caused by the roasting process. As a result, the usual wetting of the electrodes with potassium hydroxide at the assembly of cylindrical cells can be eliminated and the assembly process made easier.

Thus, by the method of the invention there results a good sinter foil with a definite discharge reserve which can be rolled or shaped and which is practically free of nitrate. The foil can be installed dry, without electrochemical "in between" treatment and after quantitatively measured addition of the electrolyte and sealing of the cell, makes the starting of operation in the gas-tight sealed condition possible.

There is claimed:

1. In a method for the manufacture of a negative cadmium electrode containing a discharge reserve for gas-tight alkaline storage batteries involving forming an electrode structure which contains cadmium hydroxide the improvement which comprises incorporating in said electrode structure an organic cadmium compound which will thermally dissociate and heating said electrode structure containing said organic cadmium compound to decompose said organic cadmium compound and produce a discharge reserve in said negative cadmium electrode.

2. Method according to claim 1 wherein a solution of said organic cadmium compound is soaked into said electrode structure after impregnation with cadmium hydroxide.

3. Method according to claim 1 wherein said electrode structure containing cadmium hydroxide is roasted to convert at least part of said cadmium hydroxide to cadmium oxide and thereafter an aqueous solution of said organic cadmium compound is soaked into said electrode structure, said water of said aqueous solution rehydrating said cadmium oxide to cadmium hydroxide.

4. Method according to claim 1 wherein said organic cadmium compound is selected from the group consisting of cadmium formate, cadmium oxalate or cadmium acetate.

5. Method according to claim 1 wherein said organic cadmium compound is cadmium formate.

6. Method according to claim 1 including incorporating in said electrode structure an organic nickel compound which will also thermally dissociate and upon said heating of said electrode structure will decompose said organic nickel compound to produce nickel.

7. Method according to claim 1 including adding a control gas to aid in control of content of said discharge reserve selected from the group consisting of hydrogen, nitrogen or oxygen to the atmosphere generated by said decomposition of said organic cadmium compound.

8. Method according to claim 7 wherein said control gas is hydrogen.

* * * * *